United States Patent [19]
Arroyo

[11] Patent Number: 5,630,003
[45] Date of Patent: May 13, 1997

[54] LOOSE TUBE FIBER OPTIC CABLE

[75] Inventor: Candido J. Arroyo, Lithonia, Ga.

[73] Assignee: Lucent Technologies Inc., Murray Hill, N.J.

[21] Appl. No.: 565,705

[22] Filed: Nov. 30, 1995

[51] Int. Cl.$^6$ ................................................ G02B 6/44
[52] U.S. Cl. ...................... 385/113; 385/103; 385/106; 385/109
[58] Field of Search ............................. 385/113, 100–114

[56] References Cited

U.S. PATENT DOCUMENTS

| | | | |
|---|---|---|---|
| 4,078,853 | 3/1978 | Kempf et al. | 350/96.23 |
| 4,595,793 | 6/1986 | Arroyo et al. | 174/121 A |
| 4,784,461 | 11/1988 | Abe et al. | 385/100 |
| 4,867,526 | 9/1989 | Arroyo | 350/96.23 |
| 4,909,592 | 3/1990 | Arroyo et al. | 385/113 |
| 5,133,034 | 7/1992 | Arroyo et al. | 385/107 |
| 5,229,851 | 7/1993 | Rahman | 385/114 |
| 5,390,273 | 2/1995 | Rahman et al. | 385/112 |

*Primary Examiner*—Phan T. H. Palmer

[57] ABSTRACT

An optical fiber cable has a plurality of loose tubes, each containing at least one optical fiber which is wound to form a loose helical configuration. The loose tubes each contain one or more filamentary members of superabsorbent material. The loose tubes are arrayed around a central organizing member and the assembly is surrounded by a strength member forming a jacket. The strength member is layered with superabsorbent material and the empty spaces within the jacket contain yarn members of superabsorbent material. The entire assembly is surrounded by an outer jacket of suitable material, preferably fire resistant.

14 Claims, 2 Drawing Sheets

LOOSE TUBE FIBER OPTIC CABLE

FIELD OF INVENTION

This invention relates to a communication cable primarily for use in outside plant applications and, more particularly, to a fiber optic cable having water blocking means incorporated therein.

BACKGROUND OF THE INVENTION

Optical fibers, as used in communications, afford many advantages, such as, for example, large bandwidth capacity and small size, over the more common and typical metallic wire arrangements.

On the other hand, optical fibers, which are generally made of fused silica or other glasses, are extremely delicate and are detrimentally affected by tensile stresses, abrupt bending, and static fatigue, in addition to various other types of stress. Thus, glass fibers, despite a theoretical high tensile strength, in actuality have low tensile strength and are subject to breakage when incorporated in a cable that, as in outside plant applications, must be pulled through ducts or the like. When such a cable is bent to accommodate changes in routing, for example, the fibers contained therein, if bent too sharply, as often happens, are subject to microbending cracks and consequently loss of signal transmission capability.

If the cable is subjected to moisture, as almost invariably happens in outside plant applications, this too can have a detrimental effect on the optical fibers. In the presence of moisture, glass will ultimately fracture under sustained stress even though the stress is actually below the tensile strength of the fiber because of the growth of surface flaws, which are aggravated by the moisture. Furthermore, glass fibers, in very long lengths, exhibit a low strain at break, usually less than one-half of one percent elongation before fracture. Inasmuch as each fiber in a cable carries or transmits several signal channels, any fracture occurring in just one fiber can mean the loss of the channels transmitted thereon, as well as possibly or probably necessitating the replacement of the section of the cable wherein the fracture occurred.

In view of the foregoing problems, as well as others inherent in or arising from, the rise of optical fibers in cables, much effort has been directed toward a cable design which eliminates or at least minimizes the detrimental effects of the various kinds of stress, as noted in the foregoing. In U.S. Pat. No. 4,078,853 of Kempf, et al., there is shown a "loose tube" cable design that overcomes most of the stress problems. This desirable result obtains from a structure in which the optical fibers are structurally isolated from the surrounding loading or cable environment. According to the invention of that patent, a plurality of light transmitting optical fibers, forming a cable core, are contained in a loose-fitting envelope or jacket so that the core fibers are substantially longitudinally decoupled from the rest of the cable structure and thus are not subjected to longitudinal tensile forces applied to the cable itself. Such a structural isolation also minimizes radial impact loads on the fibers of the core. Surrounding the enveloping structure or inner jacket is an outer jacket which is reinforced with primary strength members having a tensile modulus and a strain at break greater than that of the glass fibers. The primary strength members are tightly coupled to, or integrated into, the outer cable jacket so that they will carry the expected loads. Hence, under special loading conditions, the externally applied tensile stresses are substantially taken up by the primary strength members and not passed on to its core fibers. The optical fibers within the loose tube or tubes, where a plurality of such tubes are included in the cable, are preferably longer than the tube itself, being coiled or otherwise helixed into the tube in a slack state. As a consequence, any bending or tensile elongations of the cable itself does not immediately affect the fibers, such stresses being countered or absorbed by the cable structure itself without being applied to the fibers as a result of their being de-coupled from the physical cable structure. As a result, the fibers are, in effect, protected from these stresses with a greatly decreased likelihood that they will be affected thereby.

In some cable configurations, each loose tube has a central organizing member extending along its length about which the fibers are helically wound, thus creating considerable fiber slack while holding the fibers in an organized arrangement. Such an arrangement enhances the protection of the fibers from not only longitudinal stresses but from bending stresses also. Inasmuch as the fibers in a loose tube arrangement, whether they be stranded or incorporated into a ribbon structure, are individually accessible, such an arrangement also lends itself to splicing, either of individual fibers, or of groups of fibers.

One of the most prevalent problems in cable use, regardless of whether the cable contains metallic conductors or optical fibers, is the intrusion of moisture into the cable. This problem is especially acute in outside plant cable use, where ambient conditions are constantly changing. These changes in the ambient conditions lead to the diffusion of moisture into the cable from the outside thereof, and such diffusion eventually can lead to an undesirably high level of moisture inside the cable, which can have a detrimental effect on the signal transmitting members, and hence, on the signal transmission. As pointed out hereinbefore, moisture detrimentally affects both metallic conductors and optical fibers. Moisture can also be introduced into the cable because of a compromise in the integrity of, for example, the outer jacket. Common causes of such failure of the jacket can be rodent attacks or mechanical impacts tending to damage the jacket. Whenever moisture is present in the interior of a cable, it tends, over a period of time, to migrate or flow longitudinally along the cable and into cable connections at the splice closures or terminals and the like. In the special case of optical fibers, passage of the water therealong to connection points or terminals and associated equipment located, for example, inside closures, can not only result in damage to such equipment, especially to any metal parts thereof, but can cause problems at low temperature or freezing environments due to fiber microbending.

Many optical fiber cables have one or more longitudinally extending tapes wrapped around the core of the cable which include a super-absorbent material that swells upon contact with water to block the flow of water along the cable length. In U.S. Pat. No. 4,867,526 of Arroyo, such a cable is disclosed. In the cable of that patent, there is interposed between the core and the jacket an elongated substrate member of non-metallic, non-woven, web-like material in the form of a tape which has been impregnated with a super-absorbent material. The tape material is relatively compressible and has sufficient porosity and sufficient super-absorbent capacity so that it functions as a water block upon contact therewith. In another prior art cable, a water blockable yarn is interposed between a core and an inner surface of the cable jacket. The yarn extends linearly along the cable or, alternatively, it may be helically wrapped about a portion of the sheath system. The yarn preferably is one which comprises a super-absorbent fiber material which, upon contact with water, swells and inhibits the flow or movement of water within the cable.

In other prior art arrangements, efforts have been made to use a yarn-like strength member that has been treated with a super-absorbent liquid material which, when dry, fills the interstices of the yarn-like strength member. In another embodiment, a filamentary strand material comprising a water absorbent fibrous material is wrapped around each of the strength members. It has been found that, for a number of reasons, treating the strength member with a super-absorbent material is both impractical and uneconomical.

In U.S. Pat. No. 5,133,034 of Arroyo et al., there is shown an optical fiber cable which overcomes most of the aforementioned problems. That cable comprises a plurality of optical fiber components, each of which includes a buffered fiber and a high strength aramid yarn. The components are arranged about a central organizer and are surrounded by a water blocking strength member system. The strength member system comprises a strength member layer disposed between two adjacent super-absorbent material layers. The entire assembly is surrounded by and enclosed within an outer jacket, preferably of a low halogen, fire resistant plastic material. Supplementary water blocking members of water swellable fiber material are disposed within the jacket to fill the gaps and interstices created by the fiber component arrangement.

Prior an cables, as evidenced by the arrangement discussed in the foregoing, have been directed primarily to buffered fiber or ribbon fiber arrangements and, for the most part, have not addressed the problem of water intrusion into a loose tube cable arrangement. In a loose tube arrangement, the tubes, themselves, are conduits for the passage of water therealong, and thus, present an additional problem not present in a typical buffered fiber arrangement as shown in the U.S. Pat. No. 5,133,034 patent. In general, it has been the practice to inject a flooding compound, such as petrolatum grease, into the cable sheath to act as a moisture barrier and, in some instances, to surround the flooding compound with a layer of aluminum tape. The flooding compound is of grease-like consistency, and must be removed from the fibers when splicing or termination operations are to be performed. Thus, it is common practice prior to splicing, for example, to use grease removing compounds and wipes to clean the fibers, a messy and time consuming operation. The aluminum tape simply compounds the problem inasmuch as it, too, must be removed. Removal of the aluminum tape can be especially difficult when it adheres to the inner jacket, as often happens. In addition, the aluminum tape, being metallic can, where the cable is used in outside plant applications, attract lightening.

SUMMARY OF THE INVENTION

The present invention is a loose tube type of optical cable that overcomes many of the problems discussed in the foregoing, while retaining the advantages of loose tube construction, as discussed hereinbefore.

The cable of the invention comprises a central, longitudinally extending organizer rod about which are arrayed a plurality of loose tubes. The rod is preferably of a material such as a glass-epoxy compound, although polyethylene can also be used as can certain types of superabsorbent yarn which have a degree of strength and rigidity sufficient to function as an organizer. The loose tubes are each formed of a suitable flexible material such as a polybutane material or high density polyethylene which, although flexible, is still sufficiently tough and stiff enough to provide at least some impact protection. Within each of the loose tubes is a longitudinally extending group of loosely wound, in helical fashion, optical fibers. Each fiber is preferably coated with a protective coating of, for example, an acrylate, and has a diameter much less than the inner diameter of the loose tube. Thus, a loose tube can contain a large number of fibers without impeding their freedom of movement.

Surrounding the array of tubes is a strength member, in tubular form, which comprises, for example, strands of aramid fibers such as the commercially available KEVLAR®. Such fibers are characterized by high tensile strength, medium to low elongation and ultra high modulus, and, when formed into a jacket or tube, afford high impact strength as well. The jacket or tube thus formed has a layer of super-absorbent material on both the inner surface and the outer surface which, in one embodiment of the invention, is applied in the form of a powder which adheres to the surfaces. As with any super-absorbent material, the powder expands upon contact with moisture to block the movement thereof within the cable. The spaces and interstices formed in the interior of the jacket have supplementary water blocking members formed of a water swellable fibrous yarn, such as a cotton yarn impregnated with super-absorbent material or commercially available Lanseal®, a super absorbent fiber. The entire assembly of cable core, layered strength member, and water blocking yarn is enclosed in an outer jacket of polyethylene or other suitable material.

In accordance with the present invention, each of the loose tubes has disposed therein, in addition to the organizing member and the optical fibers, one or more filamentary strands of super-absorbent yarn which extend longitudinally along the length of the tube. One suitable commercially available yarn material is Lanseal®, a super-absorbent fiber. The filamentary strands function the same as the other super-absorbent yarns, and swell to block the passage of water upon contact therewith. It is necessary that the fibers within each of the loose tubes be able to move relatively freely, hence, the tubes preferably are not packed with super-absorbent fibers. On the other hand, because the fibers, even when swollen, produce a gel-like material which is relatively soft and yielding, they do not unduly hinder movement of the fibers. The use of such super-absorbent filaments obviates the use of grease components for water blocking purposes.

In another embodiment of the invention, super-absorbent tapes are used to replace the powder applied to the inner and outer surfaces of the strength member.

These and other features of the present invention will be more readily apparent from the following detailed description, read in conjunction with the accompanying drawings.

DETAILED DESCRIPTION

Figure 1:
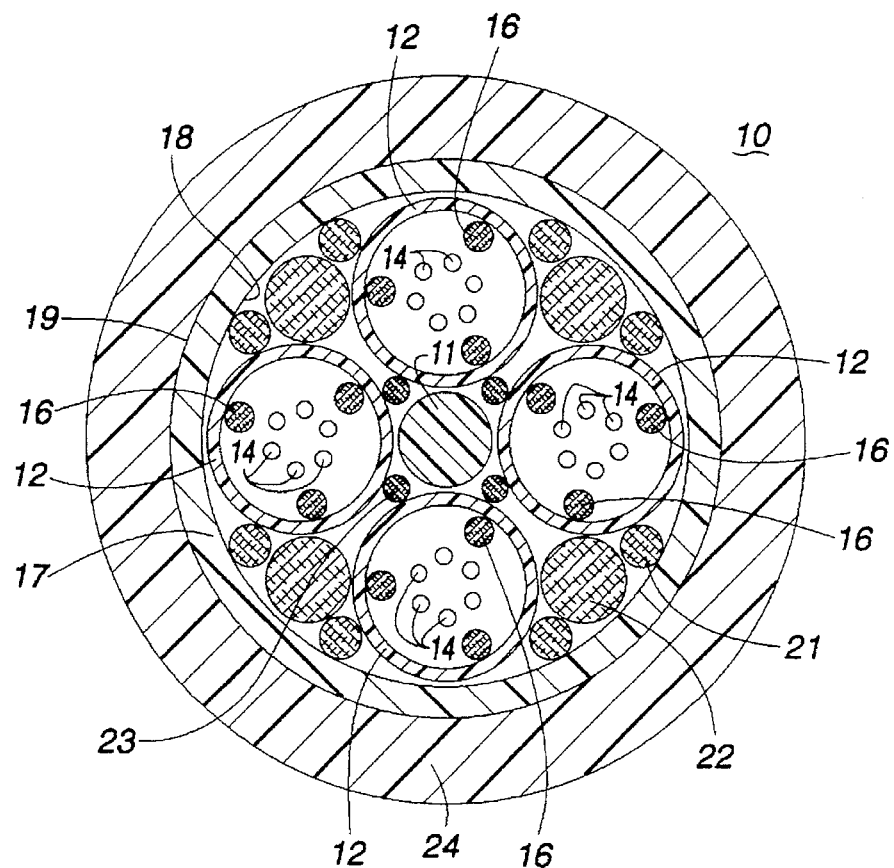
FIG. 1 is a cross-sectional elevation view of the cable of the invention.
Figure 2:
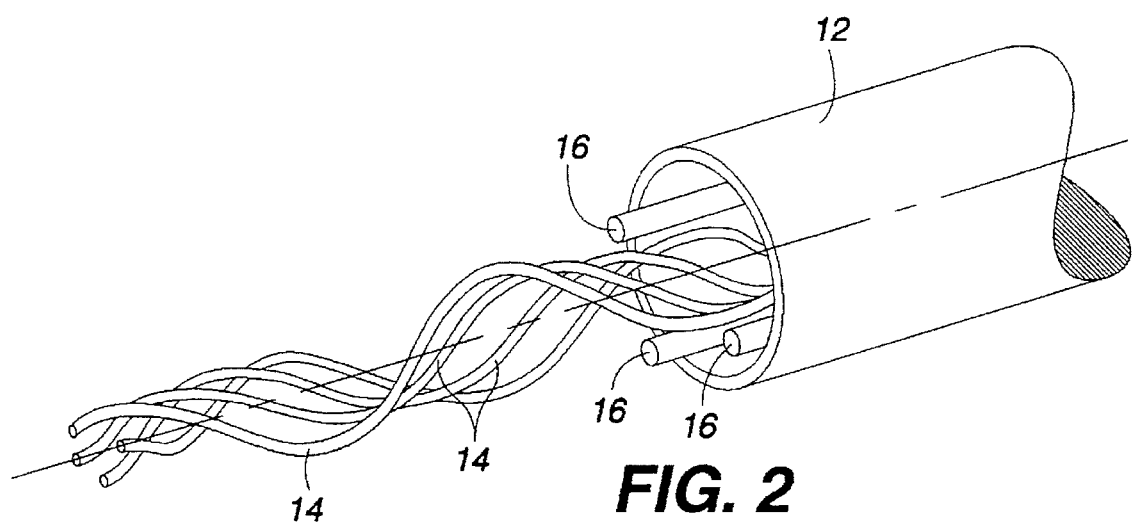
FIG. 2 is a perspective view of a portion of the cable of FIG. 1.

In FIG. 1 there is shown, in cross-section, a cable 10 embodying the principles of the present invention. Cable 10 has a centrally located, longitudinally extending organizer rod 11 of suitable material, preferably a glass epoxy material which is sufficiently flexible to allow bending of the cable 10. Alternatively, other materials, such as polyethylene or the like may be used as the organizer member 10, but, unlike the cable of U.S. Pat. No. 5,133,034, it is not necessary that the organizer 10 be made of a water blocking material, although such material might be used. The advantage of a glass epoxy material for the organizer 11 is that it supplies a measure of tensile strength to cable 10 which most superabsorbent yarns do not. Arrayed around rod 11 is a plurality of tubular members 12 of a material such as polybutane or high density polyethylene which is both flexible and tough enough to provide a measure of impact protection. Within each of the loose tubes 12 is a longitudinally extending array of individual loose fibers 14 which, as is the practice in the prior art, are coated with an ultra violet cured resin, an acrylate, or the like for protection of the fiber itself, and also to increase the diameters thereof to where the fibers 14 can be more easily manipulated for splicing, connecting and the like. As will be discussed hereinafter, the fibers 14 are preferably coiled or helically wound along the length of the loose tube. In fabrication of the loose tube-fiber assembly, the tube is extruded under tension around the fibers so that fiber length and tube length are equal. However, when the tension on the tube is released, it contacts so that the fibers are longer than the tube. Subsequent manufacturing steps impart a loose helical configuration to the group of fibers, as shown in FIG. 2.

In accordance with one aspect of the invention, each of the tubes 12 has one or more strands or filaments 16 of a super-absorbent fiber yarns extending along the length thereof for the purpose of blocking the flow of any water that might enter one or more of the tubes 12. A superabsorbent fiber suitable for this use of filaments 16 is the commercially available Lanseal-F®, manufactured by Toyobo Co., Ltd. of Osaka, Japan. The number of filaments 16 in each tube should not be such that free movement of the fibers 14 is impeded, hence, as shown in FIG. 1, only three such filaments 16 are shown. On the other hand, if the ingress of water is such as to cause the filaments to swell, the fibers 14 are still moveable with respect to the tubes 12 inasmuch as the filaments, being relatively soft and yielding, permit movement of the fibers. In addition, the filaments 16, which are not affixed to the tubes 12, are movable with respect thereto under the various stresses encountered. The filaments, when swollen, also provide some impact protection for the fibers 14.

Surrounding the assembly of organizer 11 and tubes 12 is a strength member in the form of a yarns 17. Yarns 17 may be made of any of a number of suitable materials, such as an aromatic polyamide, but a preferred material is an aramid fibrous yarn which is available commercially as KEVLAR® from E. I. DuPont de Nemours. The yarns 17 is built up from a plurality of such yarns (not shown) to form a complete surrounding of the periphery of the core assembly KEVLAR® is a registered name for a family of aramid (aromatic polyamide) fibers which are tough, light, and of quite high tensile strength, which makes KEVLAR® an excellent material for the strength members 17.

As shown in FIG. 1, the inner surface of the strength members 17 has a layer 18 of superabsorbent material thereon, and the outer surface of strength members 17 likewise has a layer 19 of a superabsorbent material thereon. In the arrangement shown in FIG. 1, the superabsorbent layers 18 and 19 consist of a hydrophilic material applied in powder form to the surfaces of yarn strength members 17 with sufficient cohesion to insure that the material stays in place. Powder hydrophilic materials are known, examples being cellulosic or starch-graft copolymers, or synthetic superabsorbents which are especially useful because of their microbial resistance. Such synthetic superabsorbents include polyelectrolytes and non-electrolytes, the former being preferred. Of the polyelectrolytes, polyacrylic acid and polyacrylonitrite-based materials are the most common. Hydrophilic materials absorb water quickly, and when contacted by water, form a reaction product in the form of a gel which is effective to block the flow of water.

Within the volume enclosed by the strength members 17 are numerous voids. In the cable of the invention, as shown in FIG. 1, these voids and interstices are filled by superabsorbent yarn members 21, 22 and 23 of different sizes. The material of such members 21, 22 and 23 may be any of a number of superabsorbent materials such as, for example, Lanseal® which has excellent water absorption and swelling properties, as pointed out hereinbefore.

Surrounding and enclosing the yarn strength members 17 is an outer jacket 24 of suitable material such as polyvinyl chloride (PVC) or a suitable polyethylene, which is preferably fire resistant. With the core and inner strength members 17 enclosed by the jacket 24, and with the several water blocking members 16, 18, 19, 21, 22 and 23, as shown, the cable 10 is well protected against any accumulation of excess water or any flow of such water along the length thereof.

In FIG. 2 there is shown a perspective view of one of the loose tubes 12. Loose tube 12 contains a group of fibers 14 which extends the length thereof and about which are loosely wound, in helical fashion. The loose helical winding represents the slack or helical state of the fibers 14 under no load and permits elongation of the fibers 14, as will occur, for example, under tensile forces or in cable bends, without the fibers, themselves, being forced to bear any of the tensile loads of the cable. Thus, there is little likelihood that the fibers will be bent to a radius less than the critical radius, or that they will be broken by elongation from tensile forces.

Figure 3:
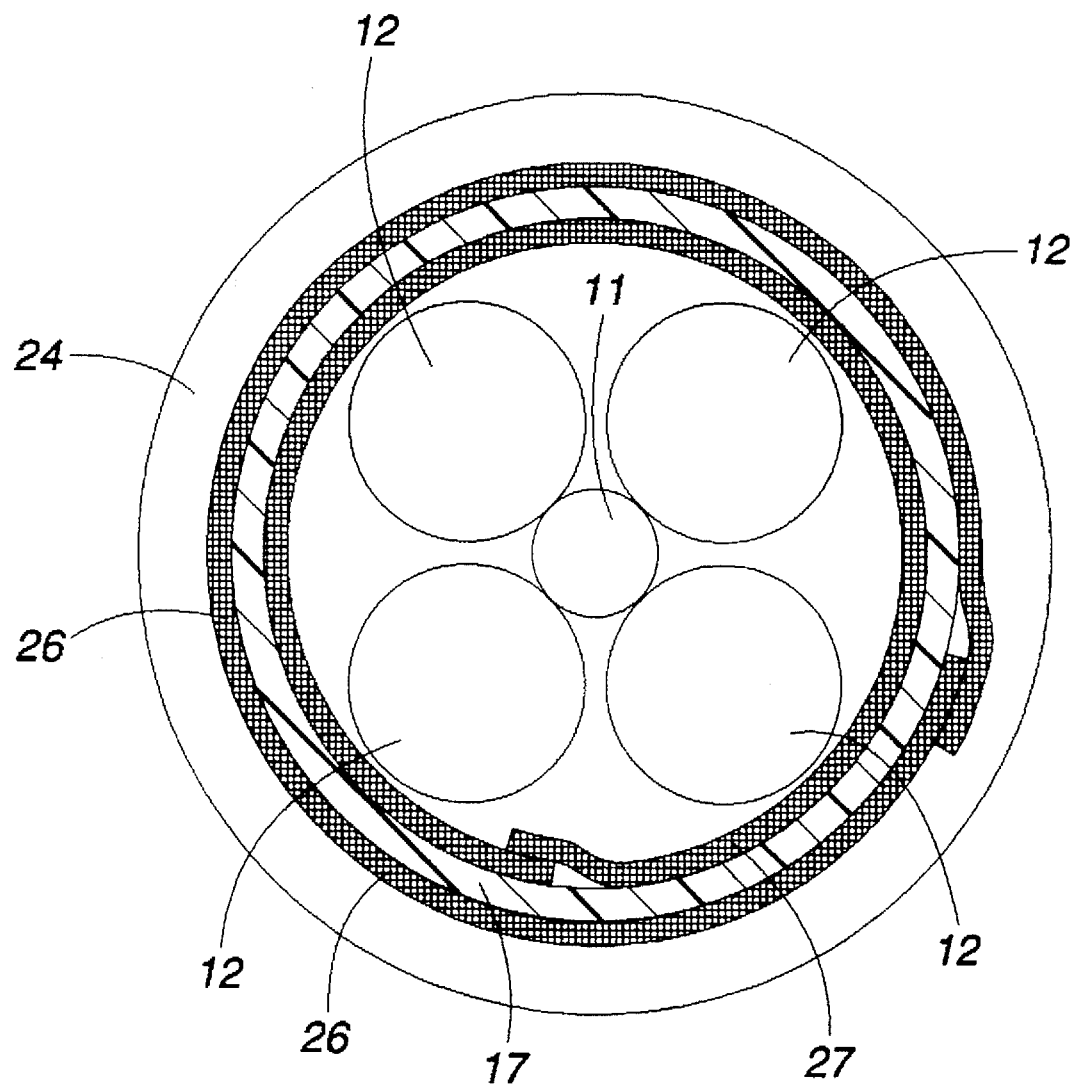
FIG. 3 is a partial cross-sectional view of a second embodiment of the invention.

The cable of the invention, in a second embodiment thereof, is shown in a partial cross-sectional view in FIG. 3, and is basically the same configuration as the cable of FIG. 1. However, instead of the layers 18 and 19 of hydrophilic material applied directly to the inner and outer surfaces of the strength member 17, the outer surface of member 17 has a water blocking tape 26 wound longitudinally thereabout and in contact therewith along its length forming an outer layer. The tape may be, for example, of hydrophobic material treated with a water blocking material. In U.S. Pat. No. 4,909,592 of Arroyo, et al., such a tape is shown which comprises a non-woven polyester material having a web structure comprising randomly arranged fibers bonded at the cross-overs. The fibers may be formed of any plastic resin or any other material which is capable of maintaining its shape during extrusion of the core. Alternatively, the tape 26 may be a nylon spunbonded fabric, nonwoven glass, cellulose fabric or the like. It is to be preferred that the tape be continuous in nature to add an additional increment of tensile strength to the cable. The formed tape is impregnated with a superabsorbent or hydrophilic material such as a cellulosic or starch-graft polymer or synthetic superabsorbent, discussed hereinbefore, sufficient to render the tape and absorbent material swellable upon contact with water, thus adding to the water blocking capabilities of the cable. The spunbonded tape 26 may be impregnated with any of a number of other materials also. Thus, it may be impregnated, for example, with a superabsorbent material derived from an aqueous solution of an acrylate polymeric material which combines acrylic acid and sodium acrylate and water. In FIG. 3 there is also shown a second tape member 27 forming a layer on the inner surface of the member 17 which preferably is the same kind of tape as tape layer 26. This second layer 27 enhances the water blocking capabilities of the cable in its interior volume and also adds an increment of tensile strength to the cable. Layer 27 eliminates the need for the superabsorbent yarns 21, 22 and 23 shown in FIG. 1. The cable of the invention, as depicted in FIGS. 1, 2 and 3, has sufficient superabsorbent members to make it capable of substantially completely blocking the flow of water longitudinally along its length. The superabsorbent material of the several superabsorbent components forms a gel and changes the viscosity of the intruding water at the point of contact therewith, making it more viscous and resistant to further water flow. In the cable of the invention, the loose tubes contain water blocking materials which in the normal operating state, are dry and non-interfering with the optical fibers in the tubes. Thus, connections and splicings may be performed on the fibers without the necessity of removing grease and cleaning the fibers prior to such connections or splicings.

In conclusion, it should be noted that it may be obvious to those skilled in the art that many variations and modifications may be made to the preferred embodiment of the invention without departure from the principles of the present invention. Further, in the claims hereafter, the corresponding structures, materials, acts, and equivalents of all means or step plus function elements are intended to include any structure, material, or acts performing the functions in combination with other claimed elements as specifically set forth in the claims.

I claim:

1. A communication cable comprising:

a core having a longitudinal axis and comprising at least one optical fiber communication medium;

a first longitudinally extending organizing member substantially axially disposed in said core;

at least one tubular member disposed adjacent said organizing member;

at least one optical fiber member within said tubular member wound in a loose helical configuration, said optical fiber member having a diameter considerably less than the inner diameter of said tubular member, thereby forming a loose tube assembly;

at least one longitudinally extending filamentary member of superabsorbent material within said tubular member;

said optical fiber member being free to move within said tubular member relative to said filamentary member;

a layered strength member surrounding and enclosing said first organizing member and said tubular member to form a first jacket, said strength member comprising a tubular member of material of high tensile strength and having an inner surface and an outer surface;

a first layer of water blocking material on said inner surface of said tubular member;

a plurality of water blocking members disposed within said first jacket; and a second jacket surrounding and enclosing said first jacket.

2. A communication cable as claimed in claim 1 and further including a second layer of water blocking material on said outer surface of said tubular member.

3. A communication cable as claimed in claim 2 wherein said first layer and said second layer of water blocking material each comprises a layer of powdered hydrophilic material.

4. A communication cable as claimed in claim 3 wherein the hydrophilic material is a cellulosic polymer.

5. A communication cable as claimed in claim 3 wherein the hydrophilic material is a synthetic superabsorbent in powder form.

6. A communication cable as claimed in claim 2 wherein said first layer and said second layer of water blocking material are each formed of a non-woven, spun bonded cellulosic fabric impregnated with a superabsorbent hydrophilic material.

7. A communication cable as claimed in claim 2 wherein first and second layers of water blocking material are each formed of a non-woven glass material impregnated with a superabsorbent hydrophilic material.

8. A communication cable as claimed in claim 2 wherein said first and second layers of water blocking material are each formed of a non-woven nylon material impregnated with a superabsorbent hydrophilic material.

9. A communication cable as claimed in claim 2 wherein said first layer and said second layer of water blocking material are each formed by a tape of non-woven polyester material treated with a water blocking material.

10. A communication cable as claimed in claim 1 wherein said tubular member of said strength member is made of an aromatic polyamide material.

11. A communication cable as claimed in claim 10 wherein the material of said strength member is an aramid yarn, said strength member being formed with a plurality of such yarns.

12. A communication cable as claimed in claim 1 wherein said first organizing member is of glass-epoxy material.

13. A communication cable as claimed in claim 1 wherein each of said plurality of water blocking members comprises a longitudinally extending superabsorbent yarn.

14. A communication cable as claimed in claim 13 wherein said superabsorbent yarn is Lanseal®.

* * * * *